United States Patent [19]

Nakajima et al.

[11] 4,331,864

[45] May 25, 1982

[54] APPARATUS FOR DETECTING AN IN-FOCUSED CONDITION OF OPTICAL SYSTEMS

[75] Inventors: Yoshio Nakajima; Shuichi Takayama; Kosaku Tsuboshima, all of Hachioji; Teruo Iwasawa, Mitaka; Masafumi Yamazaki, Okaya, all of Japan

[73] Assignee: Olympus Optical Company Limited, Tokyo, Japan

[21] Appl. No.: 86,674

[22] Filed: Oct. 19, 1979

[30] Foreign Application Priority Data

Oct. 30, 1978 [JP] Japan .................................. 53/133558

[51] Int. Cl.³ .............................................. G01J 1/36
[52] U.S. Cl. ........................................ 250/204; 354/25
[58] Field of Search ............... 250/201, 204, 208, 209; 354/25; 356/4

[56] References Cited

U.S. PATENT DOCUMENTS

| | | | |
|---|---|---|---|
| 3,875,401 | 4/1975 | Stauffer | 250/201 |
| 4,185,191 | 1/1980 | Stauffer | 354/25 |
| 4,203,031 | 5/1980 | Kamachi et al. | 250/204 |

Primary Examiner—David C. Nelms
Attorney, Agent, or Firm—Stevens, Davis, Miller & Mosher

[57] ABSTRACT

An apparatus for detecting an in-focused condition of optical systems by using two values of indices of performance each derived from the number of differences between illumination signals obtained per picture element, comprising first and second image sensors arranged in front of and in the rear of a focal plane of the optical system, first and second analog data processing circuits, and a comparing means.

8 Claims, 2 Drawing Figures

APPARATUS FOR DETECTING AN IN-FOCUSED CONDITION OF OPTICAL SYSTEMS

BACKGROUND OF THE INVENTION

This invention relates to an apparatus for detecting an in-focused condition of optical systems such, for example, as a camera and microscope or the like.

Various detecting apparatuses have heretofore been proposed which utilize two values of indices of performance each derived from the number of differences between illumination signals obtained per picture element. One of these conventional apparatuses comprises a first photosensitive element composed of a cadmium sulfide arranged in front of a focal plane of an optical system, a second photosensitive element arranged in the rear of the focal plane, a first analog-to-digital converter connected to the first photosensitive element, a second analog-to-digital converter connected to the second photosensitive element in order to obtain two digital values of indices of performance. In such apparatus, images are formed sequentially on each unit of photosensitive element by deflecting a mirror, so that the apparatus is large in size and requires complicate control operations.

In other conventional apparatus for detecting an in-focused condition of optical systems, two outputs delivered from photosensitive elements are compared with each other and during which the optical system is moved to and fro. As a result, it is difficult to precisely detect an in-focused condition. In addition, this apparatus can only detect a direction of deflection from an in-focused condition, but could not quantitatively detect its magnitude, so that the apparatus is troublesome in control and less responsive.

SUMMARY OF THE INVENTION

An object of the invention, therefore, is to provide an apparatus for detecting an in-focused condition of optical systems which can obviate the above mentioned drawbacks which have been encountered with the prior art techniques, which is small in size and simple in construction, which can precisely detect an in-focused position of the optical systems, and which can bring the optical system automatically and effectively into an in-focused condition.

A feature of the invention is the provision of an apparatus for detecting an in-focused condition of optical systems comprising a first image sensor arranged in front of a focal plane of the optical system and receiving a first image formed thereon, said first image sensor being composed of charge transfer elements whose photosensitive elements are aligned with each other per picture element, a second image sensor arranged in the rear of a focal plane of optical systems and receiving a second image formed thereon, said second image sensor being composed of a charge transfer elements whose photosensitive elements are aligned with each other per picture element, a first analog data processing circuit which produces a first value of index of performance from the first image formed on the first image sensor, a second analog data processing circuit which produces a second value of index of performance from the second image formed on the second image sensor, and a comparing means for comparing said first and second values of indices of performance and producing an analog differential signal between said first and second values of indices of performance, and means for detecting a direction and magnitude of deviation of said optical system from its in-focused position by means of a polarity and amplitude of said analog differential signal delivered from said comparing means.

Further objects and features of the invention will be fully understood from the following detailed description with reference to the acccompanying drawings, wherein:

DETAILED DESCRIPTION OF THE PREFERRED EMBODIMENTS

Figure 1:
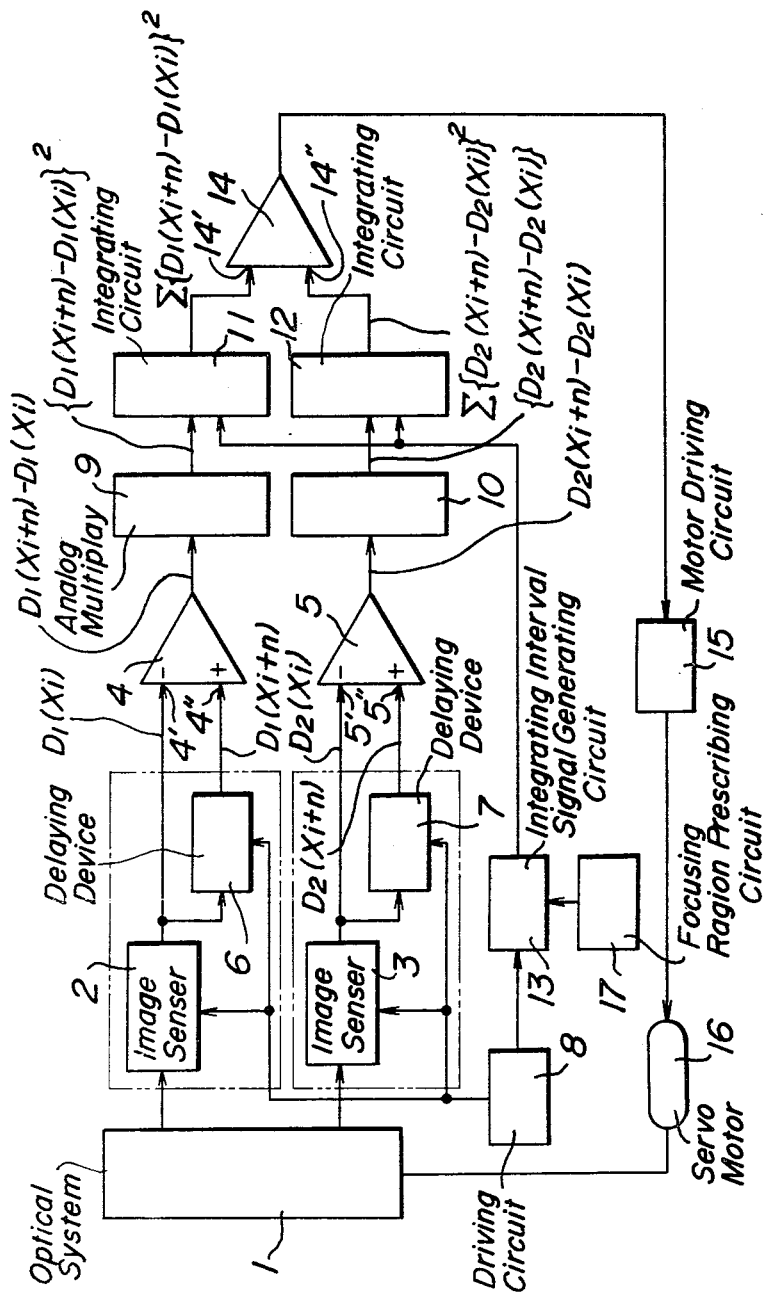
FIG. 1 is a block diagram of an embodiment of an apparatus for detecting an in-focused condition of optical systems according to the invention.

FIG. 1 shows a block diagram of an embodiment of an apparatus for detecting an in-focused condition of optical systems according to the invention. In the present embodiment, use is made of an index of performance given by $\Sigma\{D(Xi+n)-D(Xi)\}^2$ for the purpose of automatically bringing an optical system 1, for example, an objective lens for a camera into an in-focused position or condition, where $D(Xi)$ represents an illumination signal on a photosensitive element i and $D(Xi+n)$ represents an illumination signal on a photosensitive element $i+n$ which is separated from the photosensitive element i by number n of photosensitive elements (or n of picture elements). A first image sensor 2 is arranged in front of a focal plane of the optical system 1. The first image sensor 2 is composed of a charge transfer element such as a charge coupled device whose photosensitive parts or elements are aligned with each other per picture element. A second image sensor 3 is arranged in the rear of the focal plane of the optical system 1. The second image sensor 3 is also composed of a charge transfer device such as a charge coupled device whose photosensitive parts or elements are aligned with each other per picture element. These first and second image sensors 2 and 3 arranged in front of and in the rear of the focal plane of the optical system 1 are positioned relative to each other so that a first value of index of performance derived from the first image sensor 2 coincides with a second value of index of performance derived from the second image sensor 3 when the optical system 1 is correctly focused in its in-focused condition.

Output signals from the first image sensor 2 is processed in analog by a first analog data processing circuit which comprises a first differential amplifier 4, a first n picture-element delaying device 6, a first analog multiplier 9 and a first integrator 11. Output signals from the second image sensor 3 is processed in analog by a second analog data processing circuit which comprises a second differential amplifier 5, a second n picture-element delaying device 7, a second analog multiplier 10 and a second integrator 12. For this purpose, the output of the first image sensor 2 is connected directly to one of the input 4' of the first differential amplifier 4 and connected through the first n picture-element delaying device 6 to the other input 4" of the differential amplifier 4.

The first n picture-element delaying device 6 is composed of a charge coupled device. The output of the second image sensor 3 is connected directly to one of the inputs 5' of the second differential amplifier 5 and connected through a second n picture-element delaying device 7 to the other input 5" of the differential amplifier 5.

The second n picture-element delaying device 7 is composed of a charge coupled device. These image sensors 2 and 3 and delaying devices 6 and 7 are driven by a clock signal from a driving circuit 8. The first image sensor 2 and first n picture-element delaying device 6 function to supply illumination signals $D_1(X_i)$ and $D_1(X_i+n)$ to the negative input 4' and positive input 4" of the first differential amplifier 4, respectively. The second image sensor 3 and second n picture-element delaying device 7 function to supply illumination signals $D_2(X_i)$ and $D_2(X_i+n)$ to the negative input 5' and positive input 5" of the second differential amplifier 5. In the present embodiment, the image sensor 2 and delaying device 6, and the image sensor 3 and delaying device 7 are arranged on one and the same semiconductor chips, respectively.

The first differential amplifier 4 functions to produce from its input illumination signals given by $D_1(X_i)$ and $D_1(X_i+1)$ an analog differential signal given by $\{D_1(X_i+n)-D_1(X_i)\}$. The differential signal is then supplied to a first analog multiplier 9. The second differential amplifier 5 functions to produce from its input illumination signals given by $D_2(X_i)$ and $D_2(X_i+n)$ an analog differential signal given by $D_2(X_i+n)-D_2(X_i)$. The differential signal is then supplied to a second analog multiplier 10. The first analog multiplier 9 functions to obtain the square of the differential signal given by $\{D_1(X_i+n)-D_1(X_i)\}$ and delivered from the first differential amplifier 4, that is, to obtain $\{D_1(X_i+n)-D_1(X_i)\}^2$ which is then supplied to a first integrating circuit 11. The second analog multiplier 10 functions to obtain the square of the differential signal given by $\{D_2(X_i+n)-D_2(X_i)\}$ and delivered from the second differential amplifier 5, that is, to obtain $\{D_2(X_i+n)-D_2(X_i)\}^2$ which is then supplied to a second integrating circuit 12.

The first integrating circuit 11 functions to integrate the output signal given by $\{D_1(X_i+n)-D_1(X_i)\}^2$ and delivered from the first analog multiplier 9 and produce in analog a first value of index performance given by $\Sigma\{D_1(X_i+n)-D_1(X_i)\}^2$, which is then supplied to one of the inputs 14' of a servo amplifier 14. The second integrating circuit 12 functions to integrate the output signal given by $\{D_2(X_i+n)-D_2(X_i)\}^2$ and delivered from the second analog multiplier 10 and produce in analog a value of index performance given by $\Sigma\{D_2(X_i+n)-D_2(X_i)\}^2$, which is then supplied to the other input 14" of the servo amplifier 14.

Similar to the image sensors 2 and n picture-element delaying device 6, and image sensor 3 and n picture-element delaying device 7, the integrating circuits 11 and 12 are composed of a charge coupled device, respectively. The integrating interval is determined by a signal generated in an integrating interval signal generating circuit 13 in synchronism with the clock pulse delivered from the driving circuit 8. The integrating interval determined by the integrating signal generating circuit 13 can be set arbitrarily by a focusing region circuit 17.

The servo amplifier 14 functions to produce a differential signal from its two input signals. The differential signal is supplied through a motor driving circuit 15 to a servo motor 16 which is driven in response to a polarity and amplitude of the differential signal. The servo motor 16 functions to move the optical system 1 in a direction in which the two values of index of performance may be brought into coincidence with each other, hence the optical system 1 is brought into its in-focused condition.

In the above described embodiment, the images formed on the image sensors 2 and 3 are scanned by the clock signals delivered from the driving circuit 8 without using the rotating mirror. As a result, the optical system as a whole can be made simple and compact in construction. Moreover, the illumination signals delivered from each of the photosensitive elements is processed in analog so as to obtain a value of index performance and as a result, it is possible to make the data processing circuit very simple in construction.

In addition, the output signal from the servo amplifier 14 is of analog and directly represents a direction and a magnitude of the datum for moving the optical system 1, so that the movement of the optical system 1 can be controlled in a simple and easy manner.

Furthermore, the image sensor 2 and n picture-element delaying device 6, and the image sensor 3 and n picture-element delaying device 6, and the image sensor 3 and n picture-element delaying device 7 are arranged on one and the same semiconductor chip, respectively. As a result, these devices can be produced in a simple manner. Thus, the apparatus for detecting an in-focused condition of optical systems according to the invention becomes compact as a whole.

Figure 2:
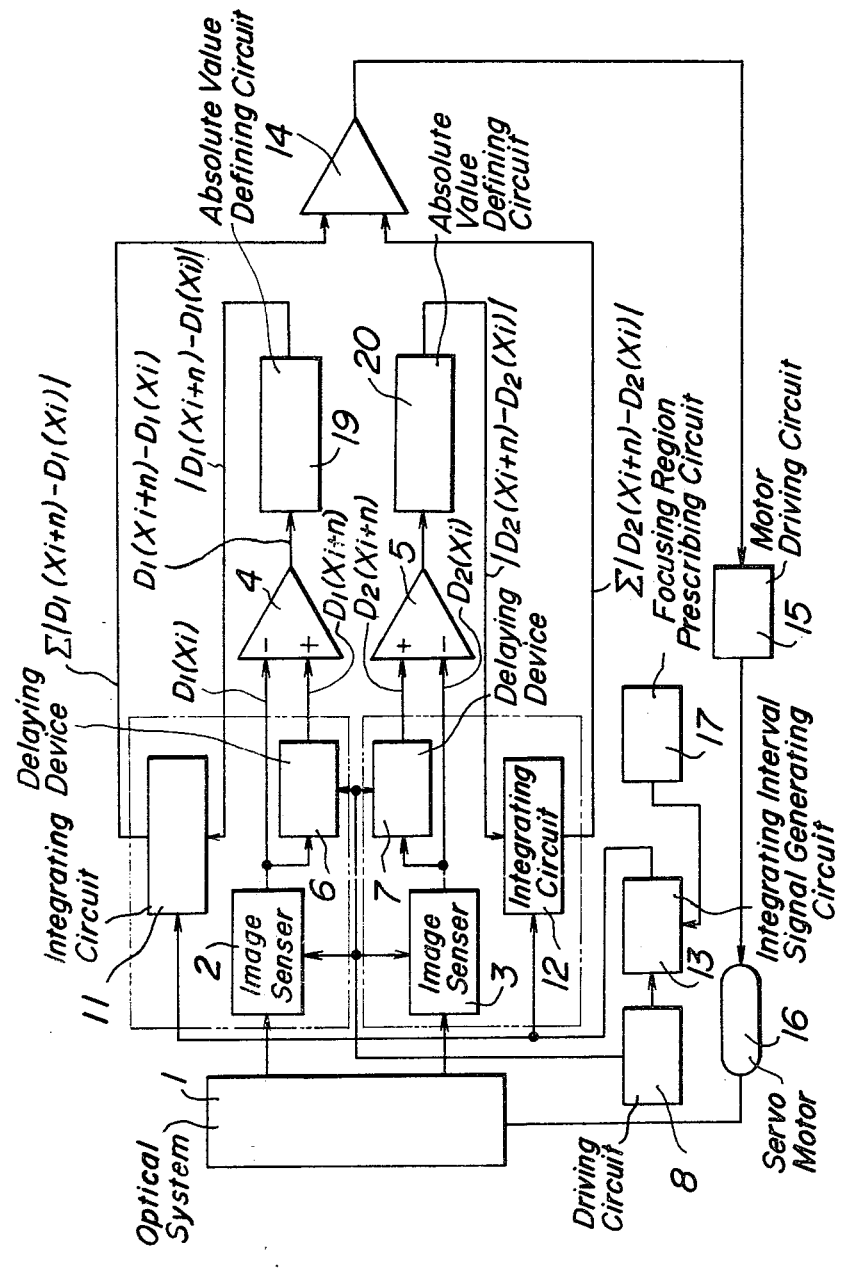
FIG. 2 is a block diagram of another embodiment thereof.

FIG. 2 shows another embodiment of an apparatus for detecting an in-focused condition of optical systems according to the invention. In the present embodiment, use is made of an index of performance given by $\Sigma|D(X_i+n)-D(X_i)|$. The difference of this index of performance from that used in FIG. 1 requires absolute value defining circuits 19 and 20 instead of the analog multipliers 9 and 10 shown in FIG. 1. Other circuit elements correspond to those shown in FIG. 1, so that corresponding elements are denoted with the same reference numerals as in FIG. 1.

In the present embodiment shown in FIG. 2, the integrating circuit 11 is also arranged on a semiconductor chip on which are arranged a first image sensor 2 and first n picture-element delaying device 6. Similarly, an integrating circuit 12 is arranged on one and the same semiconductor chip on which are arranged a second image sensor 3 and second n picture-element delaying device 7.

Similar to the previous embodiment shown in FIG. 1, the embodiment shown in FIG. 2 does not use mirrors for scanning images and functions to produce signals in analog. As a result, the apparatus as a whole becomes simple in construction and can be controlled in a simple and easy manner. Moreover, an image sensor, n picture-element delaying device and integrating circuit which correspond to each other are arranged on one and the same semiconductor chip, so that the apparatus as a whole can be produced in more simple and easy manner.

As stated hereinbefore, in the apparatus according to the invention, a focus condition of optical systems is detected by a comparison between two analog values of indices of performance derived from two image sensors arranged in front of and in the rear of a focal plane of the optical system, so that the apparatus can precisely detect an in-focused condition of the optical systems and is simple and compact in construction.

The invention is not limited to the above described embodiments and various changes and modifications may be made. For example, use may be made of an index of performance derived from any number of adjacent picture elements.

Such index of performance includes, for example, a sum of absolute values, a sum of square values and a sum of cubic values of difference of (m−1)th order obtained from adjacent m picture elements. This merely requires additional differential amplifiers and a delaying device. In addition, instead of the charge coupled devices (CCD), use may be made of bucket brigade devices (BBD).

Moreover, a part of picture to be photographed can be used for determining an in-focused condition of optical systems by limiting an integrating interval by means of a focusing region prescribing circuit 17. Furthermore, the optical system may be manually adjusted by using a comparator instead of a servo amplifier 14 and output delivered from the comparator may be displayed on an indicator. The information notifying arrival at an in-focused condition may be announced by a lamp or buzzer. Furthermore, images formed in front of and in the rear of a focal plane may be transferred through optical fibers to any desired portion and the first and second image detectors may be arranged at the position thus determined.

As a result, it is possible to arrange all of the image sensors 2 and 3, delaying devices 6 and 7, and integrators 11 and 12 on one and the same semiconductor chip.

Finally, it should be noted that the image sensors 2 and 3 need not be separated from the focal plane by the same distance. It is only required to adjust them so that two values of the indices of performance are equal with each other at an in-focused condition.

What is claimed is:

1. An improved apparatus for detecting an in-focus condition of an optical system comprising a first image sensor arranged to receive a first image formed at a first position in front of a predetermined focal plane of the optical system and formed of a number of charge transfer elements, each element producing an illumination signal of respective picture elements of said first image; a second image sensor arranged to receive a second image formed at a second position in the rear of the focal plane of optical system and formed of a number of charge transfer elements, each element producing an illumination signal of respective picture elements of said second image; a first processing circuit for receiving said illumination signals produced by said first and second image sensors for deriving a first value of index of performance on the basis of differences between the illuminance signals supplied from the first image sensor and a second value of index of performance on the basis of differences between the illuminance signals supplied the second image sensor; and a second processing circuit for comparing said first and second values of index of performance with each other, to derive an output signal representing direction and magnitude of deviation of the optical system from its in-focused position; the improvement comprising: a first delaying device formed of a charge transfer device for delaying the successive illumination signals supplied from the first image sensor by a predetermined number of periods of the illumination signals; a second delaying device formed of a charge transfer device for delaying the successive illumination signals supplied from the second image sensor by said predetermined number of periods of the illumination signals; a first differential amplifier for comparing the successive illumination signals supplied from the first image sensor with the successive delayed illumination signals supplied from first delaying device to derive successive first difference signals; a second differential amplifier for comparing the successive illumination signals supplied from the second image sensor with the successive delayed illumination signals supplied from said second delaying device to derive successive second difference signals; a first analog multiplier for processing said successive first difference signals in an analogous manner to derive first indices of performance; a second analog multiplier for processing said successive second difference signals in an analogous manner to derive second indices of performance; a first integrating circuit for integrating the first indices of performance supplied from the first analog multiplier to derive a first value of index of performance; a second integrating circuit for integrating the second indices of performance supplied from the second analog multiplier to derive a second value of index of performance; and a comparating circuit for comparing said first and second values of index of performance supplied from said first and second integrating circuits with each other, to produce an analog difference signal having a polarity which represents a direction of deviation of the optical system from the in-focused position and an amplitude which represents a magnitude of said deviation.

2. An apparatus as claimed in claim 1, wherein: each of said first and second analog multipliers comprises a circuit for deriving a square of the difference signals $\{D(x_{i+n})-D(x_i)\}^2$, wherein $D(x_i)$ and $D(x_{i+n})$ are illumination signals of $i^{th}$ and $(i+n)^{th}$ picture elements, respectively, and n is said predetermined number of periods of the illumination signals.

3. An apparatus as claimed in claim 1, wherein: each of said first and second analog multipliers comprises an absolute value defining circuit for deriving an absolute value $|D(x_{i+n})-D(x_i)|$ of the difference signals, wherein $D(x_i)$ and $D(x_{i+n})$ are illumination signals of $i^{th}$ and $(i+n)^{th}$ picture elements, respectively, and n is said predetermined number of periods of the illumination signals.

4. An apparatus as claimed in claim 1, wherein: said first image sensor and first delaying device are arranged on a first semiconductor chip, and said second image sensor and second delaying device are arranged on a second semiconductor chip.

5. An apparatus as claimed in claim 4, wherein: said first integrating circuit is arranged on said first semiconductor chip and said second integrating circuit is arranged on said second semiconductor chip.

6. An apparatus as claimed in claim 1, wherein: the apparatus further comprises a first optical fiber having an entrance end arranged at said first position and an exit end arranged at said first image sensor to conduct the first image onto the first image sensor and a second optical fiber having an entrance end arranged at said second position and an exit end arranged at said second image sensor to conduct the second image onto the second image sensor, and said first and second image sensors, first and second delaying devices and first and second integrating circuits are arranged on one and the same semiconductor chip.

7. An apparatus as claimed in claim 1, characterized in that said charge transfer device is a charge coupled device.

8. An apparatus as claimed in claim 1, characterized in that said charge transfer device is a bucket brigade device.

* * * * *